United States Patent
Van Laar

(10) Patent No.: US 11,402,807 B1
(45) Date of Patent: Aug. 2, 2022

(54) DYNAMIC ARTIFICIAL INTELLIGENCE APPLIANCE

(71) Applicant: Kurt Daniel Van Laar, Simi Valley, CA (US)

(72) Inventor: Kurt Daniel Van Laar, Simi Valley, CA (US)

(*) Notice: Subject to any disclaimer, the term of this patent is extended or adjusted under 35 U.S.C. 154(b) by 0 days.

(21) Appl. No.: 17/316,337

(22) Filed: May 10, 2021

(51) Int. Cl.
| | |
|---|---|
| *G05B 13/02* | (2006.01) |
| *G05B 19/042* | (2006.01) |
| *G06N 3/04* | (2006.01) |
| *G06N 5/04* | (2006.01) |

(52) U.S. Cl.
CPC ....... *G05B 13/0265* (2013.01); *G05B 13/024* (2013.01); *G05B 19/042* (2013.01); *G06N 3/0472* (2013.01); *G06N 5/048* (2013.01); *G05B 2219/21109* (2013.01); *G05B 2219/25252* (2013.01)

(58) Field of Classification Search
None
See application file for complete search history.

(56) References Cited

U.S. PATENT DOCUMENTS

| | | | |
|---|---|---|---|
| 7,006,881 B1 * | 2/2006 | Hoffberg | G05B 15/02 700/17 |
| 10,839,302 B2 | 12/2020 | Wright et al. | |
| 2013/0080376 A1 | 3/2013 | Yao et al. | |
| 2015/0184549 A1 | 9/2015 | Pamujula | |
| 2019/0373264 A1 | 12/2019 | Chong | |
| 2020/0285997 A1 | 9/2020 | Bhattacharyya et al. | |

\* cited by examiner

*Primary Examiner* — Sean Shechtman
(74) *Attorney, Agent, or Firm* — SoCal IP Law Group LLP; Mark Andrew Goldstein

(57) ABSTRACT

A control apparatus providing a Dynamic Artificial Intelligence system, which employs data sets and software functions representing a plurality interactive software engine's, including Inference, Neural Net, State, and Proportional-Integral-Derivative (PID) Engines. These engines are implemented as a set of scheduled realtime monitors and callable functions with associated processes preformed within a system. Monitors dynamically estimates and determine the optimal control policy for the system and its sub-systems. Monitors utilize an iterative process of sub-steps "function calls', until a convergence states exist. Functions and sub-functions dynamically estimate the desired value for operation at a respective state of the environment over a series of predicted environmental states; using a complex return of data sets to determine bounds to improve the estimated currently desired value; and producing updated estimates of optimal control policies. DAI further interacts in realtime with external events to modify control policies.

9 Claims, 7 Drawing Sheets

DYNAMIC ARTIFICIAL INTELLIGENCE APPLIANCE

RELATED US APPLICATION DATA

This application claims priority to U.S. Utility patent application No. US 202017218079 entitled "DYNAMIC ARTIFICIAL INTELLIGENCE APPLIANCE" filed on Dec. 19, 2020, this referenced application, is superseded by, and is hereby incorporated by reference.

DESCRIPTION

Field of the Invention

The present invention relates to devices, systems, processes, and methods for dynamically analyzing, localizing, managing, and controlling processes and systems. Most comparative devices are classified as process control systems in one of three intelligence categories: First, Proportional-Integral-Derivative (PID) controllers, which usually support only a single process. Second, Inference Engines Logic (IEL), which are usually a multi-input Fuzzy Logic Engines with a fixed fuzzy knowledge base at its core. Inference Engines are difficult to program and reprogram, lending themselves mostly to fixed applications. The third intelligence category is the Neural Network (NN); this type of engine usually requires a large database, specialized hardware, and extensive active training. Neural Networks have made inroads into the process control arena, but their utilization has remained specialized.

Background of the Invention

The concept of Dynamic Artificial Intelligence (DAI) is based on the inventor's original work with complex network test equipment, software design, and applications development along with process control engines, and the Xtensor Systems XACT3000™ thru XACT7000™ products, being the initial entrants into multi-element and multi-mode process control systems. With this initial work and subsequent development cycles and after evaluating PIDs, Neural Networks, Inference Engines, and other control engine types in detail, it was concluded that combining expert Probabilistic Reasoning (PR), Inference Engine Logic (IEL) "Fuzzy Logic", Neural Networks (NN), and Evolutionary Computation Structures (ECS) which form the core of a highly-functional control appliance that can be dynamically reprogrammed and operate in concert with other like appliances.

This invention's methodology involves; 1) melding sensors and input data, with the computing power of single or multi-core System on a Chip (SOC), SOCs with Field Programmable Gate Arrays (FPGA), multi-engine dynamically modifiable hybrid ECS. Adding inference engines, and with neural net engines where appropriate, 2) providing access to local and remote data including application images and remote systems status, and 3) managing those appliances.

SUMMARY OF THE INVENTION

The present invention provides a system for dynamic process control, analyzing, localizing, identifying, managing an active control system as well as mitigating issues with within a control system by managing both hardware and software in real time.

In this disclosed iteration, inputs may be software defined virtual 10 or physical hardware including, but not limited to, digital "state change", analog "voltage or current," or applications software or messages from internal or external processes either local or remote.

The outputs may be digital, analog, applications software, or messages to internal or external processes either local or remote.

Dynamically reprogrammable sub-systems provide enhanced DAI functionality to inference engines, neural networks, interactive 110, monitors, functions, and scheduling services. This functionality is facilitated by a library of pre-programmed functions, sub-functions, and an array of monitors [FIG. 2] these monitors are scheduled "enabled or disabled" based on software interrogation of flags, functions, and applications schedules. Once enabled, a specific monitor will vector thru its tests, executing a select function and its sub-functions.

EVALUATION OF PRIOR ART

WRIGHT, et al. U.S. Pat. No. 10,839,302 Wright discusses a methodology of managing the trajectory of a single system to a null point much like a Proportional-Integral-Derivative (PID) controller. While this includes the ability to implement multiple PIDs, PIDs are relegated to being just one of many subfunctions included in this embodiment.

BHATTACHARYYA, BHASKAR, et al. US 20200285997 Bhattacharyya discusses a method of detecting and determining anomalous operation of a system using real time analog data streams and do an evaluation by comparing the data against a digitized database. This patent can provide similar functionality, but provide it as pobolistic reasoning implemented as NN or IEL subfunction with or without an automated set of responses.

CHONG, IN SUK WANG, XIANGLIN HSIEH, et al. US 20190373264 CHONG et al. provides techniques and systems are provided for compression and decompression of data in a neural network.

YAO, et al. US 20130080376 A1 In this patent application Yao specifies that Sugeno fuzzy inference systems (FIS) are specifically excluded [0066] but are allowed in this patent. This patent provides Sugeno-type fuzzy systems with learning capabilities implemented as function calls, further both Fuzzy and Neural net functions are provided as chainable sequences of operation.

PAMUJULA, SURESH US 20150184549 Pamujulas patent is predicated on the use of a "Neural Network" 71, optimizer 64 and Filter 70 FIG. 4. This design is highly dependent on the neural net to manage and process power plant data based on extensive simulations. This patent implements Neural Networks as callable subfunctions. The "Optimizer" is not described in any detail but appear not to be Inference Engins, but rather sets of specific application code. In contrast this patent provides Inference Engins as subfunctions.

HOFFBERG, ET AL. U.S. Pat. No. 7,006,881 Hoffbergs patent relates to an apparatus for processing digital media signals, comprising a digital processor for controlling the apparatus; a graphic user interface, having a wireless remote control providing a command input to the processor; a network interface for transmitting digital information from the processor to a remote location over a communications network, the information identifying a digital media signal for desired reproduction based, at least in part, on an input received from the remote control; and an output, controlled by, and local to, the processor, for transferring the desired digital media signals for reproduction thereof.

In contrast this patent is not related to digital media management or processing. in this patent application the data is process control with no graphics.

In Hoffbergs specification image processing relies only on a Neural Net running on a digital signal processor (DSP), in this patent no DSP is used and Neural Nets are but one of several data processing options, others include Inference Engines, State Machines, and Proportional-Integral-Derivative (PID).

Further Hoffbergs claims 1-5 references the need for an Ethernet whereas this patent will function without Ethernet, claims 6-10 refer to external media not necessary for this patent.

DETAILED DESCRIPTION OF THE EMBODIMENTS

Figure 1:
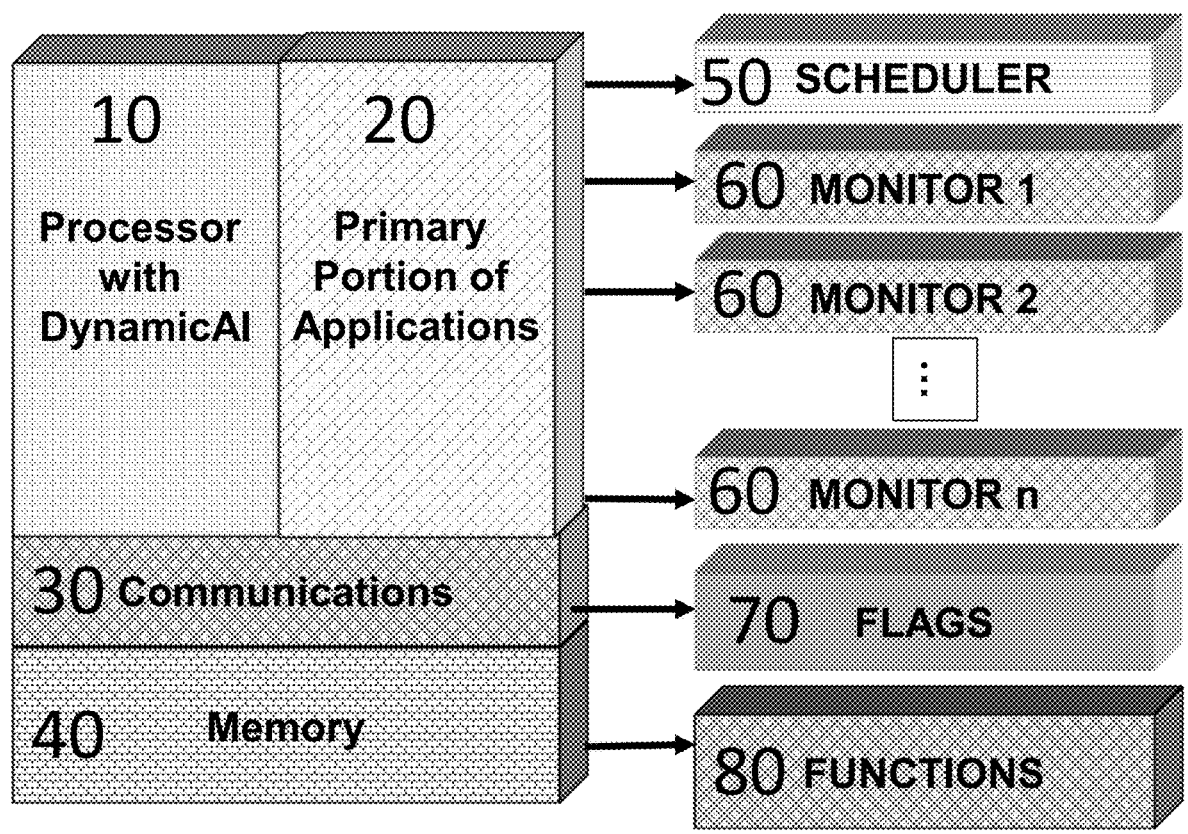
FIG. 1 is a block diagram showing the components of the present invention in its initial configuration including [10], the Processor; [20], the Primary Portion of Applications; [30], the Communications Interfaces; [40], the Memory; [50], the Scheduler; [60], the Monitors; [70], the Flags; and [80], Functions.

Several embodiments of the invention are described, by way of example and reference to the accompanying drawings, in which:

In the present invention FIG. 1, provides a block diagram of the software logic elements of a DAI system, the Processor [10] with DynamicAI which may be a single or multi-core processor with a floating-point unit and/or a math co-processor. The Primary Portion of Applications [20] contains multiple sets of applications, of which only 1 is active at a time. Communications between systems and others is handled by the Communications block [30]. The Memory [40] is shared by all.

Each application consists of a Scheduler [50] which enables and disables monitors [60]. this scheduler may be dynamically changed by subfunctions [300] or remotely by human or programmatic interaction.

a set of Monitors [60], an array of Flags [70], and a set of pre-defined Functions [80].

In operation, the Scheduler manages which Monitors are running and which are off, paused or sleeping for some programmable time.

Figure 2:
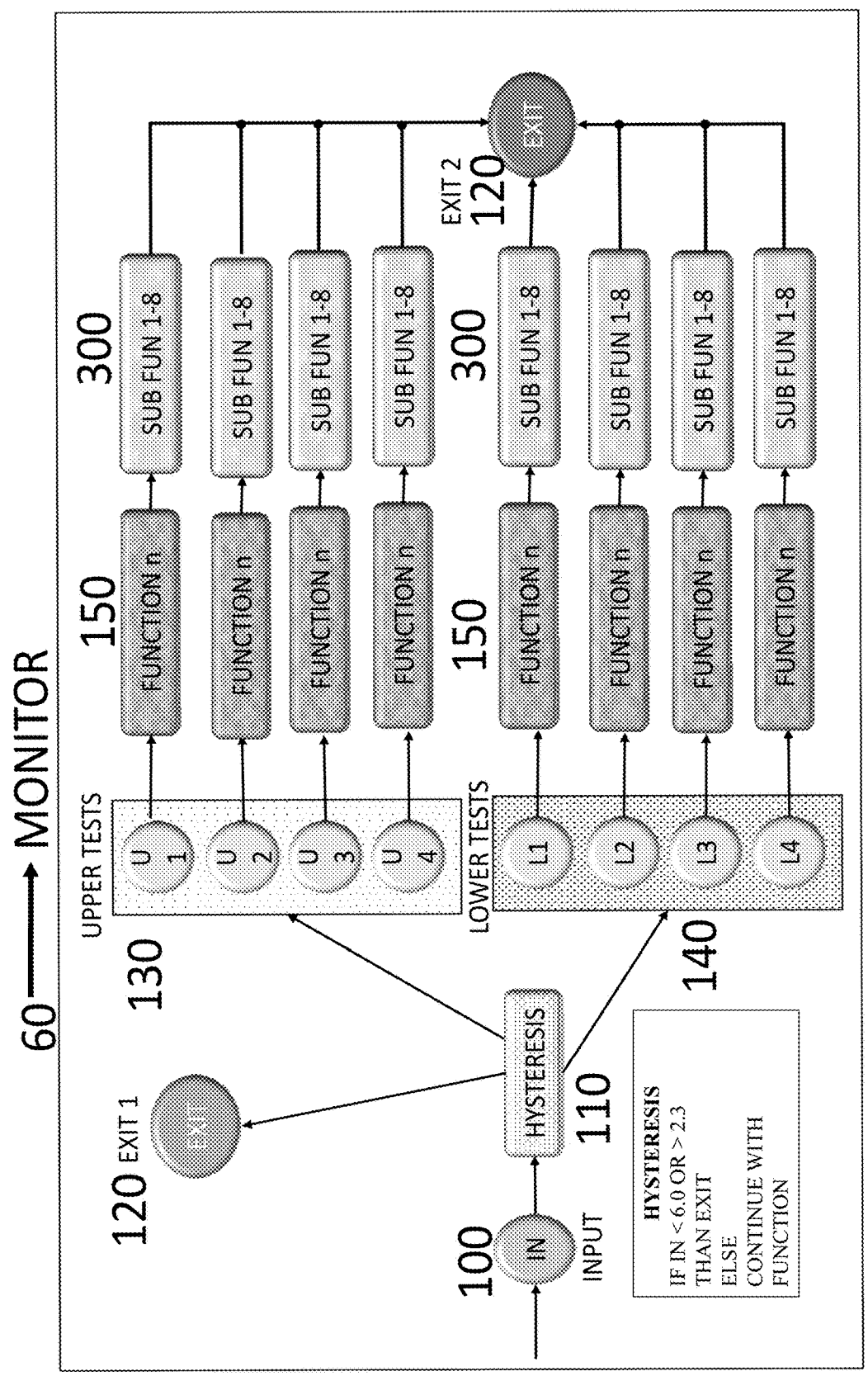
FIG. 2 one of n Monitors, [60] and its elements including [100], floating-point or state input; [110], Hysteresis Test; [120], Within Limits Exit; [130], Upper Limits Tests; [140], Lower Limits Tests; [150], Functions called by a Limit Test; and [300], Subfunctions Called by a Function.

In FIG. 2 When a Monitor [60] is selected, it evaluates its Input [100] utilizing a Hysteresis Test [110] to decide rapidly if any work needs to be done, if within limits, the monitor Exits [120], if outside the limits, the input is used to vector to an Upper [130] or Lower [140] Test. Each of the tests calls a specific Function [150], each Function may call up to 8 Subfunctions [300]. Each of the subfunctions comprise a Library Function call to be executed [310], a Destination for the result [320] and 3 preprogrammed variables; Variable 1 [330], Variable 2 [340], and Variable 3 [350].

Figures 4, 5:
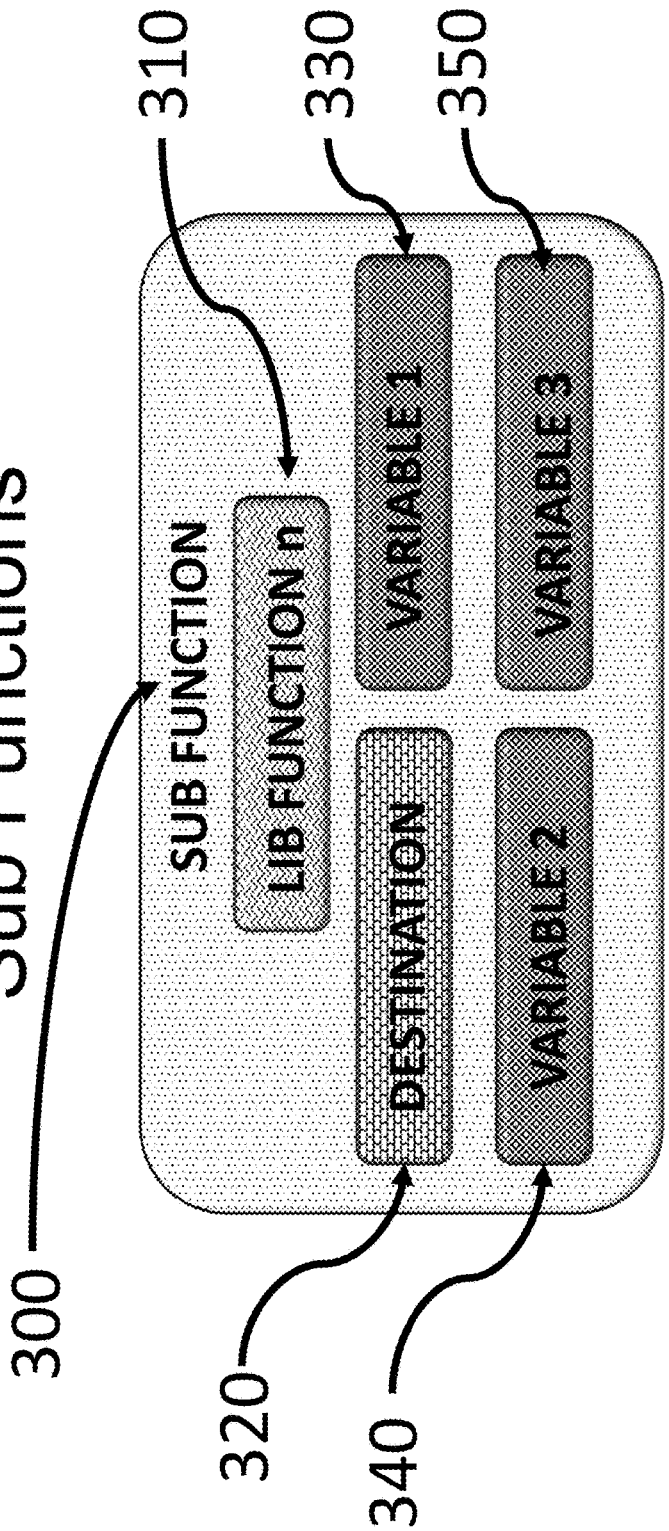
FIG. 4 is a Subfunction [300], including [310], a Subfunction Call to the Library of pre-defined functions; the destination [320], of the subfunction's action may be a memory location, port, or other; [330], Call Input Variable 1; [340], Call Input Variable 2; and [350], Call Input Variable 3. These variables may be actual data or vectors to data structures depending on the type of function called.
FIG. 5 this is a typical set of Subfunction Calls, with AOUT being an analog output port. Flags are floating-point values. DB symbols are vectors to database records.
Figure 6:
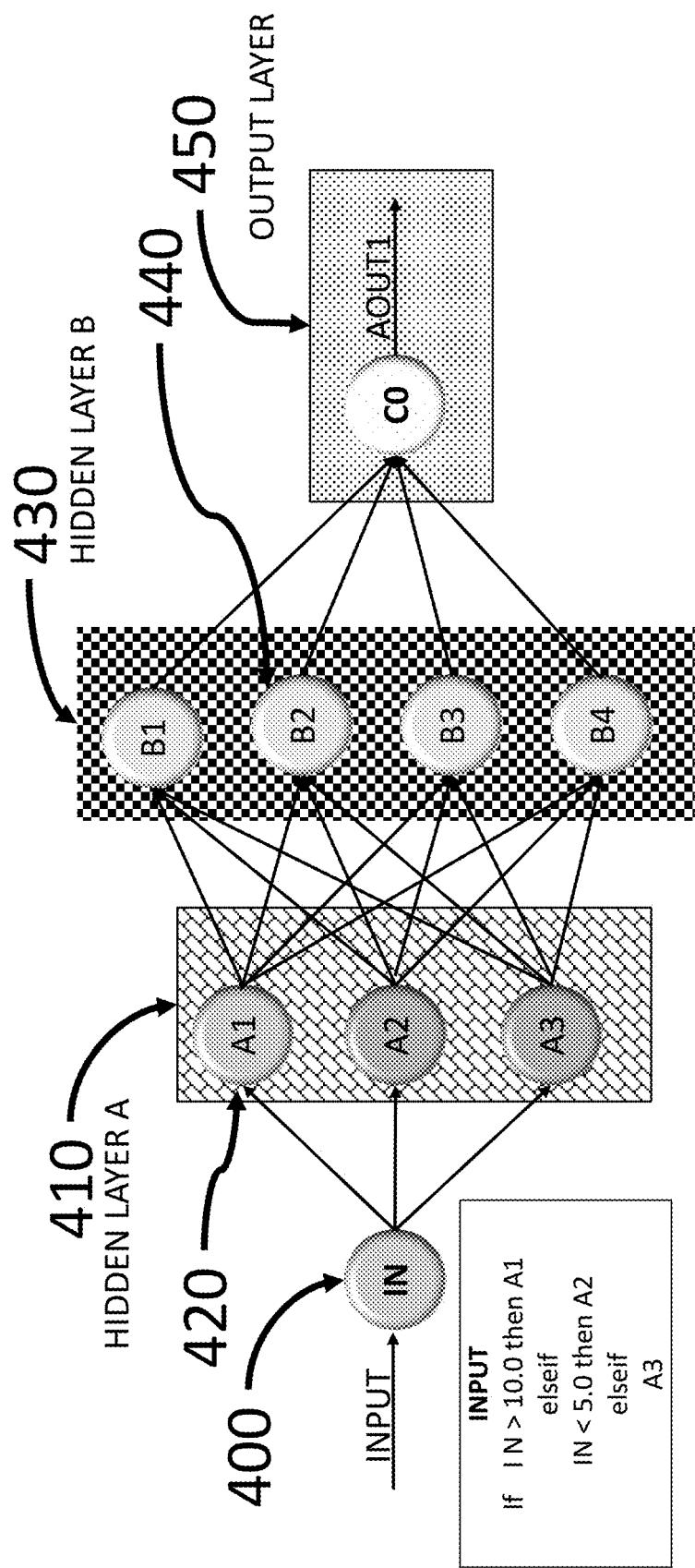
FIG. 6 depicts a subfunction implementing a single input Neural Net FUN0225, where [400], is the Floating-point initial input with dynamic input hysteresis to select a specific hidden layer; [410], Hidden Layer A; [420], one of 3 processing elements for Hidden Layer A; [430], Hidden Layer B; [440], one of 4 processing elements for Hidden Layer B; and [450], the Output Layer generated by a summary of processing elements.

FIG. 5 Depicts the following set of subfunction Library calls, these calls are discussed in examples 1-4

Example 1: Task Function; FUN0002, AOUT1, 0000, 0000, 0000. This Function turns off the DC power out pin to Analog Out Port 1 [320] with variables 2 & 3 being ignored.

Example 2: Floating Point math function Subtract; FUN0032, FLAG1, FLAG11, 0000, 0000. This Function subtracts the value in FLAG11 [330] from FLAG1 [320] and puts the result in FLAG1 [320].

Example 3: A two input Inference Engine Function; FUN0222, AOUT4, AIN2, DB22 This Function is a fuzzy engine that uses AIN2 [330] and FLAG11 [340] as inputs and utilizes data base DB22 [350] which contains the Fuzzification data set, Rules data set, and Defuzzification data sets. The resultant process posts the result to AOUT4 [320].

The DB22 [350] data base is a complex structure containing the 1) count of inputs, 2) list of inputs, 3) count of memberships for each input, 4) the universe of discourse for each input, 5) an array of memberships for each input, these memberships are stored as list elements consisting of membership minimum and maximum values, membership min and max slopes, 6) specific membership types, "triangular, trapezoidal, gaussian or bell".

The database DB22 [350] also contains an array of inference rules statements for each of the inputs as a hypercube of Fuzzy Associated Memory (FAM) elements, the data base also contains the relevant aggregation and defuzzification methodologies.

These pre-defined data structures may be single arrays, multi-dimensional arrays, or tensors, all of which may be symmetric or asymmetric.

Figure 10:
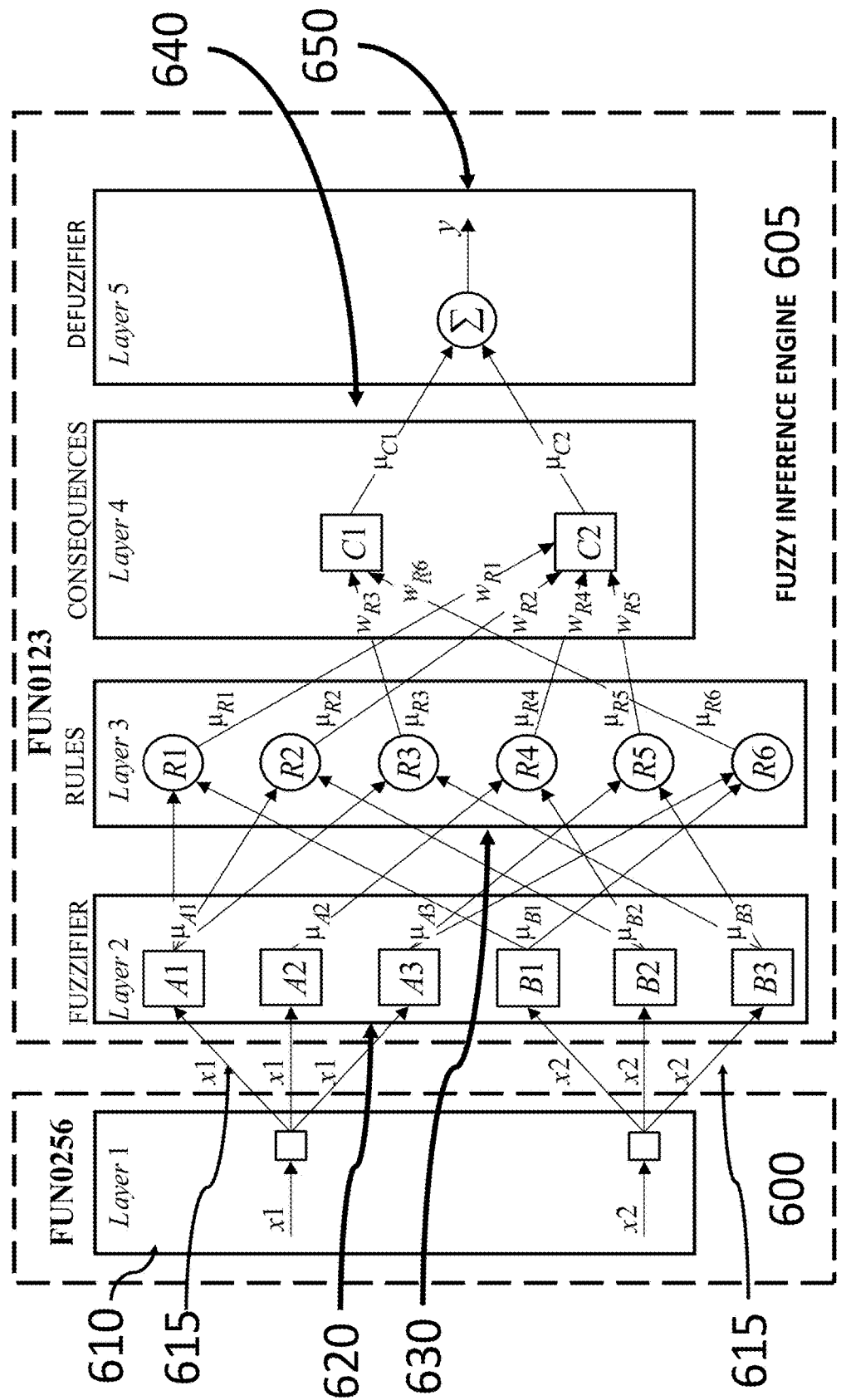
FIG. 10 Depicts two subfunctions where an Inference Engine FUNO123 [605] is preceded by a Neural Net function FUN0256 [600] with the output of the Neural Net used as the input to Inference Engine FUNO123 [605] both implemented as a subfunction calls.

Example 4: In this example FIG. 10, two subfunctions are chained with the output of the first FUN00256 [600] providing the inputs to FUN00123 [605] in this case there are two inputs to the Neural Net function [610] the neural net feeds forward to generate 6 crisp output values [615] that are feed forward to FUN00123 [605], fuzzification layer [620] where each input is converted to a linguistic variable using membership functions stored in the subfunctions database [540]. Once fuzzified the inference engine [560] applies a set of rules [630] to the layer 2 outputs and feeds the salient rules outputs to the aggregation "consequence layer" [640] which provides its results to the defuzzifier [650] which provides a crisp output.

DETAILED DESCRIPTION OF FUNCTIONALITY

Figure 3:
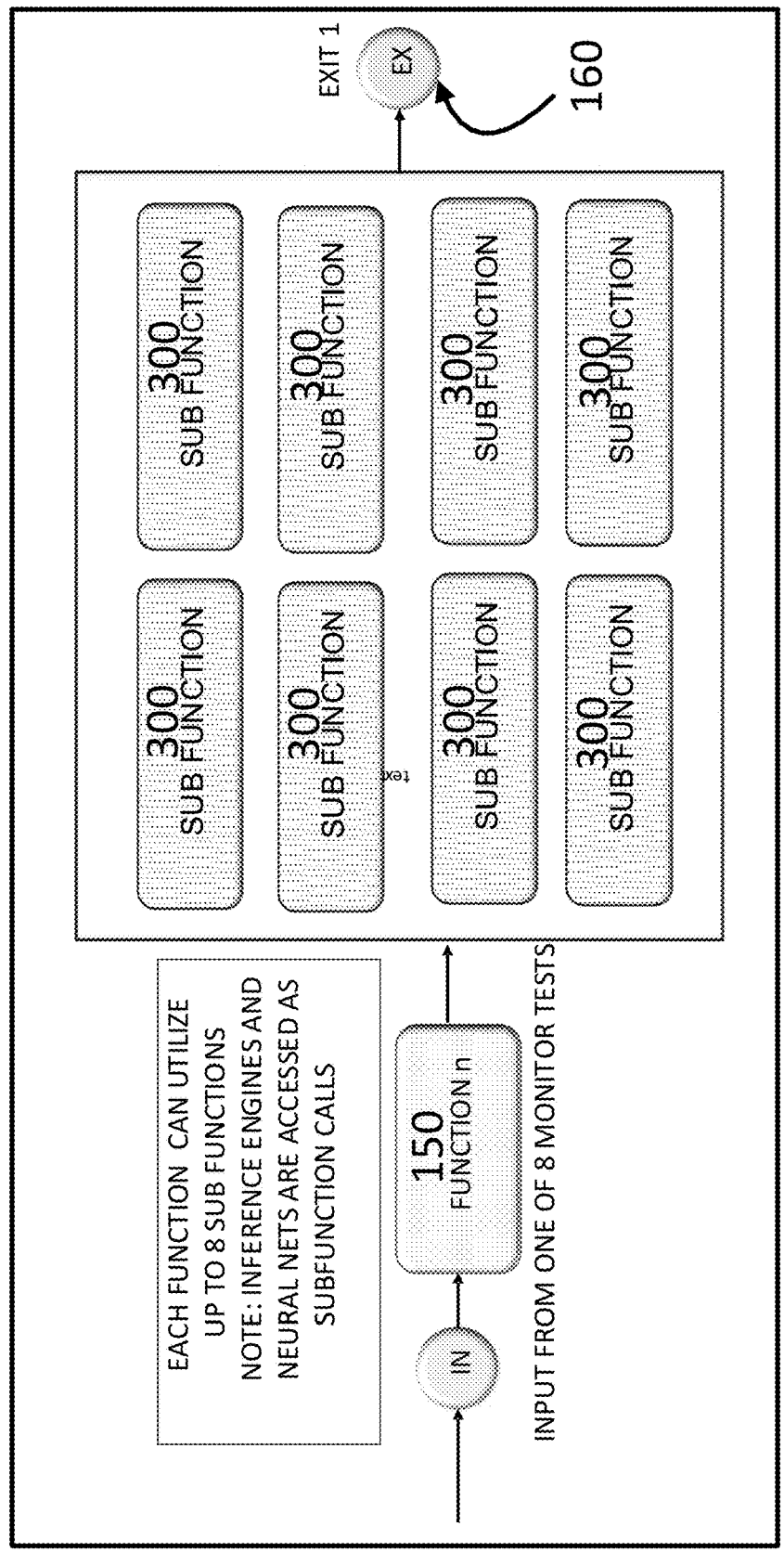
FIG. 3 one of 8 per monitor Functions [150] call with its input being a value passed thru from a monitor limit test result, this Function invokes a set of subfunction [300] calls, providing from 1 to 8 actionable actions.

The key functional elements in this appliance are FIG. 1, the Scheduler [50], Monitors [60] detailed in FIG. 2, Functions [150] detailed in FIG. 3, and Subfunctions [300] FIGS. 3, 4 & 5. each of these the subfunctions provide a specified action that is preprogrammed.

Figure 7:
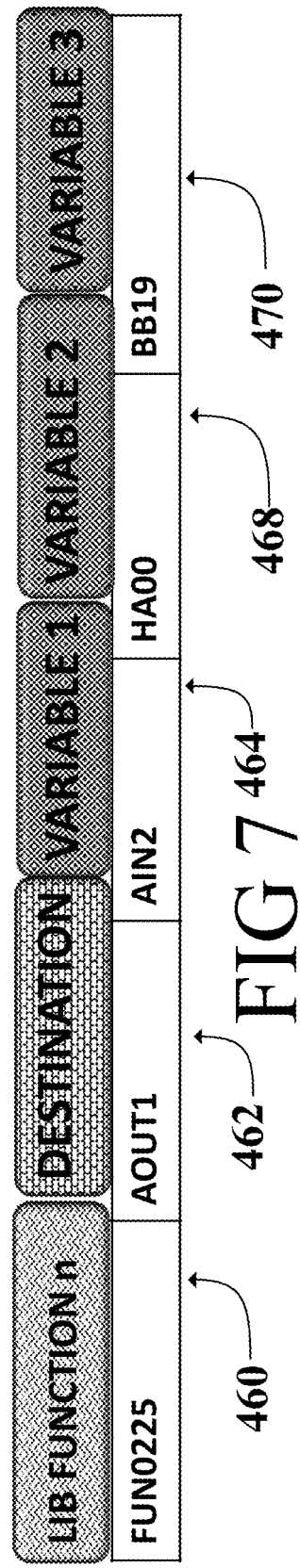
FIG. 7 Depicts a Neural Net Function Library Call with FUN0225 being the function identifier; AOUT1 the destination; AIN2 the real input data; HA00 the vector to the process data set for Hidden Layer A; and BB19 the vector to the process data set for Hidden Layer B.

In this embodiment the schedular [50] scrolls thru the enabled monitors flags on a regular basis, when a monitor flag is true that monitor [60] is called. When called, a monitor first preforms a hysteresis test [110], if the input is with hysteresis parameters the function exits [120], if the input value is less than hysteresis low trip point the lower test [140] decide which function [150] to call, If the input value is greater than hysteresis high trip points upper test [130] decide which function [150] to call. Each of the 8 available functions [150] may call up to 8 subfunctions [300] but, each must call at least one subfunction. These subfunctions are preprogrammed functions providing simple to complex procedures from simple flag setting "true/false" and floating-point math to n input neural nets [FIG. 7] and inference engines [FIG. 8] some examples are:

Example 5; FUN002 sets the DEST port power to ON or OFF depending on weather VAR 1 is True or False.

Example 6; FUN0032 it sets a DEST to the difference of VAR 1-VAR2, where DEST may be a hardware output or a memory location and VAR1 and VAR2 may be a hardware input, a memory location, or a hard value.

Example 7; The FIG. 7 subfunction call to FUN0225 [460] initiates a predefined neural network using data sets HA00 [468], and BB19 [470], with 1 input AIN2 [462], 3 hidden layers "A" defined in data set HA00 [468] and implemented in layer A process [410], 4 hidden layers "B" BB19 [470] and implemented in layer B process [430].

Figure 8:
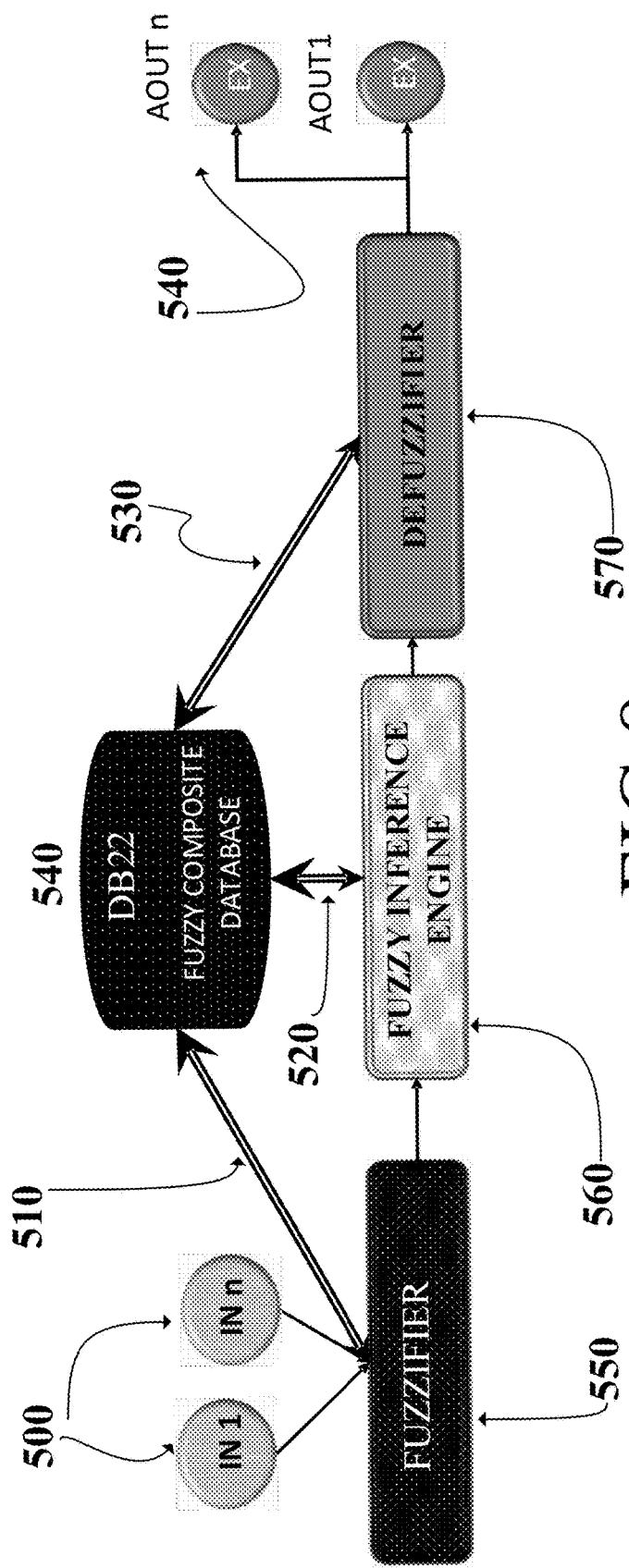
FIG. 8 is an Inference Engine that is implemented as a subfunction call.
Figure 9:
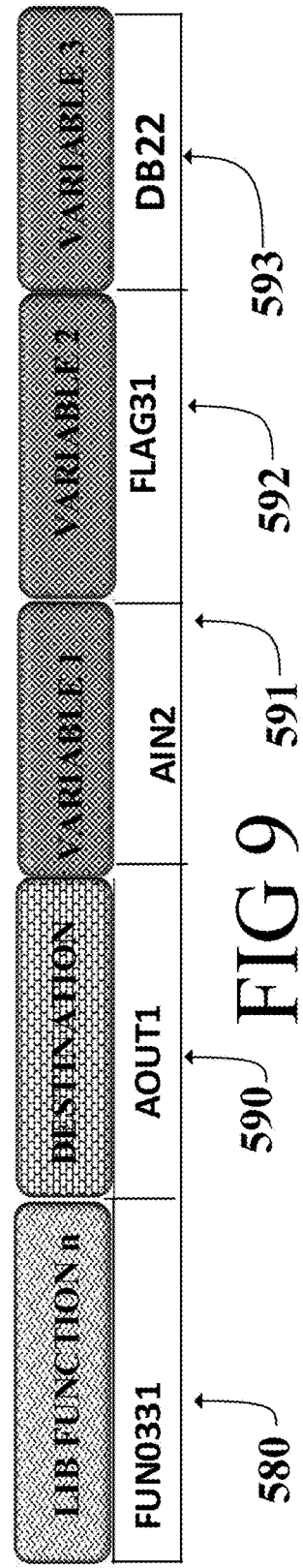
FIG. 9 depicts an Inference Engine subfunction call with a Lib Function ID, the Destination [590] of the resulting function, Variables [591,592], and a pointer to the Fuzzy composite application database [593].

Example 8; FIGS. 8 & 9 depict an Inference Engine subfunction and its call. FUN 0331 [580] initiates a predefined Inference Engine using data sets DB22 [593], and inputs AIN2 [591], and FLAG32 [592] with AOUT1 [590] as the defuzzied output. DB22 is a complex structure.

There can be many predefined programs including Neural Nets, Fuzzy or other complex algorithms with differing input counts, layer counts, etc. all utilizing arrays and structure pointers to preform run time processing.

In the implementation of fuzzy inference engines, the carry in parameters from DB22 [540] include the universe of discourse [510], a numeric range upon which the input data will be fuzzified. The count of membership elements with the centroid value, min, and max values and their slopes for each membership. The fuzzy subfunction evaluates the membership data using the inference engine [560] and rules [520] to generate a fuzzy value which is defuzzied [570] using defuzzification rules [530] to from a crisp input.

Fuzzy subfunctions may be defined to have from 1 to n inputs [500] and 1 or more outputs [540] where fuzzification, defuzzification and rules all as passed in run time parameters and the selected subfunctions data base parameters.

Advantages

Advantages of the invention include:
1. Provide multiple State Engines, Inference Engines and Neural Network Engines to interact with local I/O to provide decision-based applications that dynamically interact and react.
2. Provide real-time interaction with I/O devices.
3. Enable and disable monitors based on system state and mission plan.
4. Provide active data logging while applications are running to create a real-time data record and allow on-demand updating of a local or remote database.
5. Provide communications, cooperation, and data exchange in real-time between like systems and remote management systems.
6. Allow local algorithms to self-modify.
7. By providing multiple applications a system can switch configurations based on CONOPS to support military, civilian and space missions.

CONCLUSION

The above description presents the concepts and principles of the invention with several embodiments and variations of embodiments by which those concepts and principles can be implemented. The skilled reader will appreciate the flexibility, variations, and modifications that are possible. This flexibility is well suited different applications and design criteria, without departing from the spirit or scope of the invention as defined in the specifications and claims.

What is claimed is:
1. An apparatus for dynamically processing data using artificial intelligence, comprising:
   a computer to control the apparatus, the computer including a processor and memory;
   software included in the apparatus, which when executed by the processor provides:
   (1) a set of process applications providing artificial intelligence configured to dynamically modify state parameters of process control and mission applications,
   (2) a set of at least 32 monitors arranged with parallel priority order,
   (3) an interactive scheduler configured to enable or disable each monitor separately,
      wherein each monitor is configured to modify scheduling via individual functions and subfunctions which are configured to make the scheduling modifications,
      wherein the monitors include a plurality of input monitors each with interactively programmable hysteresis configured to allow or disallow vectoring to select functions,
      wherein one of the monitors is a scheduled monitor configured to select a function to engage based on a set of upper and lower input value tests and preform one or more of the subfunctions, wherein the subfunctions are configured to make calls to a function library, the calls including a function ID code and corresponding carry in parameters including a destination ID and one or more of a plurality of variables, (4) a plurality of inference engines where input, output, inference elements formats, and rules are programmatically selected via data set pointers within a subfunction call;

wherein the subfunction call is made to one of the plurality of inference engines, wherein some of the inference engines include pre-programmed fuzzifier and defuzzifier modules and functionality;

wherein the fuzzification and defuzzification process maintains membership functions as discreet endpoints and angles, wherein the inference engine call specifies a neural net function as an output destination, an input identifier and a set of variables, where each inference engine is re-entrant with interactive data maintained as callable structures via pointers and function identifier codes.

2. The apparatus of claim 1 wherein one of the membership functions is called specifying a center and a maximum, a field of discourse, a minimum value, an angle of the minimum value, the maximum value, and an angle of the max value.

3. The apparatus of claim 1 wherein the software further includes a downloadable library of processes, functions, and messages.

4. The apparatus of claim 1 wherein the processor is one of multi-core, a system on a chip or a field programmable gate array (FPGA).

5. The apparatus of claim 1 wherein the software is configured to communicate with a central or remote systems and provide live data to the central or remote systems.

6. The apparatus of claim 1 wherein the software is configured to communicate with a central or remote database via pre-programmed messages.

7. The apparatus of claim 1 wherein the software maintains all data as an encrypted database.

8. The apparatus of claim 1 wherein the software is modifiable via an external network connection.

9. The apparatus of claim 1 wherein the software is accessible to remote users and allows for remote access of data and status, remote management, and remote augmentation of the software.

* * * * *